(12) United States Patent
Parhar et al.

(10) Patent No.: US 10,865,331 B2
(45) Date of Patent: Dec. 15, 2020

(54) SOLVENT CEMENT FORMULATIONS

(71) Applicant: OATEY CO., Cleveland, OH (US)

(72) Inventors: Amrit Parhar, Westlake, OH (US); Willie Perez, Hudson, OH (US)

(73) Assignee: OATEY CO., Cleveland, OH (US)

( * ) Notice: Subject to any disclaimer, the term of this patent is extended or adjusted under 35 U.S.C. 154(b) by 197 days.

(21) Appl. No.: 16/074,542

(22) PCT Filed: Feb. 3, 2017

(86) PCT No.: PCT/US2017/016363
§ 371 (c)(1),
(2) Date: Aug. 1, 2018

(87) PCT Pub. No.: WO2017/136634
PCT Pub. Date: Aug. 10, 2017

(65) Prior Publication Data
US 2019/0085220 A1   Mar. 21, 2019

Related U.S. Application Data

(60) Provisional application No. 62/291,751, filed on Feb. 5, 2016.

(51) Int. Cl.
| | | |
|---|---|---|
| *C09J 127/06* | (2006.01) | |
| *C08J 5/12* | (2006.01) | |
| C08K 3/36 | (2006.01) | |
| C08K 5/07 | (2006.01) | |
| C08K 5/1535 | (2006.01) | |
| C08L 33/08 | (2006.01) | |

(52) U.S. Cl.
CPC ............ *C09J 127/06* (2013.01); *C08J 5/125* (2013.01); *C08J 2327/00* (2013.01); *C08J 2355/02* (2013.01); *C08J 2427/00* (2013.01); *C08J 2427/06* (2013.01); *C08K 3/36* (2013.01); *C08K 5/07* (2013.01); *C08K 5/1535* (2013.01); *C08L 33/08* (2013.01)

(58) Field of Classification Search
CPC ....................................................... C09J 127/06
See application file for complete search history.

(56) References Cited

U.S. PATENT DOCUMENTS

| | | | |
|---|---|---|---|
| 5,252,634 A | 10/1993 | Patel et al. | |
| 5,376,717 A | 12/1994 | Patel et al. | |
| 5,416,142 A | 5/1995 | Bush et al. | |
| 5,422,388 A | 6/1995 | Patel et al. | |
| 5,470,894 A | 11/1995 | Patel et al. | |
| 5,495,040 A | 2/1996 | Patel et al. | |
| 6,087,421 A | 7/2000 | Patel et al. | |
| 6,372,821 B1 | 4/2002 | Patel et al. | |
| 7,473,753 B2 | 1/2009 | Parhar et al. | |
| 7,838,585 B2 * | 11/2010 | Parhar ............... | C08J 5/125 524/356 |
| 2006/0030689 A1 | 2/2006 | Parhar et al. | |

FOREIGN PATENT DOCUMENTS

| | | | | |
|---|---|---|---|---|
| GB | 567098 A | * | 1/1945 | ............ C08J 5/125 |
| GB | 567098 A | | 1/1945 | |

* cited by examiner

*Primary Examiner* — Daniel H Lee
(74) *Attorney, Agent, or Firm* — BakerHostetler

(57) ABSTRACT

Provided are solvent cement formulations comprising some or all of tetrahydrofuran, cyclohexanone, methyl ethyl ketone, acetone, a thermoplastic resin, silica, and, a solvent soluble acrylic copolymer associative thickener. The disclosed formulations contain a reduced complement of volatile organic compounds (VOCs) relative to conventional cement formulations, yet are capable of meeting the requirements for regular-, medium-, and heavy-duty applications. The use of specialized associative thickener components confers a required degree of viscosity while enabling a reduction in the concentration of VOCs, such as tetrahydrofuran.

10 Claims, No Drawings

SOLVENT CEMENT FORMULATIONS

CROSS-REFERENCE TO RELATED APPLICATIONS

This application is the National Stage Application of International Patent Application No. PCT/US2017/016363 filed Feb. 3, 2017, which claims the benefit of priority to U.S. Provisional Application No. 62/291,751, filed Feb. 5, 2016, the entire contents of both of which are incorporated herein by reference.

TECHNICAL FIELD

The present disclosure pertains to adhesives, such as for pipe joining applications.

BACKGROUND

Adhesives containing organic solvents have been used for many years for joining objects made from thermoplastic materials, such as PVC (polyvinyl chloride), CPVC (chlorinated polyvinyl chloride), and ABS (acrylonitrile-butatdiene-styrene). In use, one or more of the present organic solvents partially dissolves or at least softens the surfaces to be joined, thereby achieving an intimate bond between these surfaces when the organic solvent evaporates. Normally, a small amount of thermoplastic resin, the same as or similar to the thermoplastic to be joined, is dissolved in the solvent, thereby producing what is referred to as a "solvent cement."

Various organic solvents have been used for making organic solvent-based adhesives. Examples include ketones, ethers, esters, amides, carbonates, organic sulfoxides, organic sulfones, and organic sulfides. Mixtures of different solvents are common. See, for example, the following patent documents, the disclosures of which are incorporated by reference: U.S. 2006/0030689, U.S. Pat. Nos. 6,372,821, 6,087,421, 5,495,040, 5,470.894, 5,422,388, 5,416,142, 5,376,717 and 5,252,634.

Modern environmental and health guidelines recommend or require that the content of volatile organic compounds (VOCs) in consumer products be minimized and, where possible, eliminated. Tetrahydrofuran (THF) represents a common VOC in adhesive products, including solvent cements, in which that compound functions to dissolve thermoplastics and enhance the viscosity of the adhesive formulation. In view of the status of THF as a volatile organic compound, previous efforts have been made to reduce or exclude THF from adhesive formulations, including solvent cements. A need remains, however, for adhesive formulations in which the concentration of THF is reduced relative to traditional adhesives, or is eliminated entirely, but that have the characteristics, such as viscosity, that are necessary for effective use in regular-, medium-, and heavy-duty pipe joining applications.

SUMMARY

Provided are solvent cement formulations comprising: 0-19% tetrahydrofuran; 21-49% cyclohexanone; 7-21% methyl ethyl ketone; 21-36% acetone; 8-15% thermoplastic resin; 0.5-5% silica; and, 0.01-0.4% of a solvent soluble acrylic copolymer associative thickener, wherein the percent value of all named components do not exceed 100.

Also disclosed are solvent cement formulations comprising 20-31% tetrahydrofuran; 21-29% cyclohexanone; 0-14% methyl ethyl ketone; 21-35% acetone; 10-17% thermoplastic resin; 1-4% silica; and, 0.01-0.05% of a solvent soluble acrylic copolymer associative thickener, wherein the percent value of all named components do not exceed 100.

The present disclosure also provides methods for bonding a first plastic component to a second plastic component, the method comprising applying a solvent cement to a surface of the first plastic component, and, contacting the surface of the first plastic component to a surface of the second plastic component, the solvent cement being formed from the solvent cement formulation according to the formulations described herein.

Also disclosed are plastic articles comprising a first plastic component that is bonded to a second plastic component by a solvent cement formulation according to the formulations described herein.

DETAILED DESCRIPTION OF ILLUSTRATIVE EMBODIMENTS

The present inventions may be understood more readily by reference to the following detailed description taken in connection with the accompanying examples, which form a part of this disclosure. It is to be understood that these inventions are not limited to the specific formulations, methods, articles, or parameters described and/or shown herein, and that the terminology used herein is for the purpose of describing particular embodiments by way of example only and is not intended to be limiting of the claimed inventions.

The entire disclosures of each patent, patent application, and publication cited or described in this document are hereby incorporated herein by reference.

As employed above and throughout the disclosure, the following terms and abbreviations, unless otherwise indicated, shall be understood to have the following meanings.

In the present disclosure the singular forms "a," "an," and "the" include the plural reference, and reference to a particular numerical value includes at least that particular value, unless the context clearly indicates otherwise. Thus, for example, a reference to "a component" is a reference to one or more of such reagents and equivalents thereof known to those skilled in the art, and so forth. Furthermore, when indicating that a certain element "may be" X, Y, or Z, it is not intended by such usage to exclude in all instances other choices for the element.

When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" can refer to a value of 7.2 to 8.8, inclusive. This value may include "exactly 8". Where present, all ranges are inclusive and combinable. For example, when a range of "1 to 5" is recited, the recited range should be construed as optionally including ranges "1 to 4", "1 to 3", "1-2", "1-2 & 4-5", "1-3 & 5", and the like. In addition, when a list of alternatives is positively provided, such a listing can also include embodiments where any of the alternatives may be excluded. For example, when a range of "1 to 5" is described, such a description can support situations whereby any of 1, 2, 3, 4, or 5 are excluded; thus, a recitation of "1 to 5" may support "1 and 3-5, but not 2", or simply "wherein 2 is not included."

Although previous work has attempted to address the need for low VOC adhesive formulations, few, if any efforts have resulted in cements that both have a reduced complement of volatiles and also meet the requirements for regular-, medium-, and heavy-duty applications. The present inventors have discovered that the use of specialized associative thickeners fulfills this need by conferring the required degree of viscosity while enabling a reduction in the concentration of VOCs, such as tetrahydrofuran. These and other features of the presently disclosed subject matter are described more fully herein.

Provided are solvent cement formulations comprising: 0-19% tetrahydrofuran; 21-49% cyclohexanone; 7-21% methyl ethyl ketone; 21-36% acetone; 8-15% thermoplastic resin; 0.5-5% silica; and, 0.01-0.4% of a solvent soluble acrylic copolymer associative thickener, wherein the percent value of all named components do not exceed 100. Such formulations may be referred to as "type A", in order to distinguish them from other solvent cements disclosed herein.

The type A formulations are ideal for regular-, and medium-duty uses in the context of joining piping elements, in accordance with the requirements of ASTM D2564. For example, as described more fully infra, the type A formulations meet or exceed the minimum viscosity and lap shear strength requirements under ASTM D2564.

The present formulations of type A include 0-19% tetrahydrofuran (THF). In some embodiments, the formulations may contain 0-17%, 2-18%, 5-18%, 7-17%, 10-17%, 13-16%, 0-5%, 0-3%, 0-2%, no more than 1%, less than about 1% THF, or no THF at all. In other instances, the formulations contain about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, or about 19% THF.

The present formulations of type A also include 21-49% cyclohexanone (CYH). For example, the formulations may include 22-30%, 23-28%, 23-27%, 24-26%, 40-48%, 42-47%, 43-46%, 44-46%, about 21%, about 22%, about 23%, about 24%, about 25%, about 26%, about 27%, about 28%, about 29%, about 30%, about 32%, about 34%, about 36%, about 38%, about 40%, about 41%, about 42%, about 43%, about 44%, about 45%, about 46%, about 47%, about 48%, or about 49% CYH.

The formulations of type A further contain 7-21% methyl ethyl ketone (MEK). For example, the formulations may include 8-19%, 9-19%, 10-18%, 11-17%, about 7%, about 8%, about 9%, about 10%, about 11%, about 12%, about 13%, about 14%, about 15%, about 16%, about 17%, about 18%, about 19%, about 20%, or about 21% MEK.

The formulations of type A also include 21-36% acetone (ACE). For example, the formulations may include 22-35%, 23-33%, 23-31%, 24-31%, 25-31%, about 21%, about 22%, about 23%, about 24%, about 25%, about 26%, about 27%, about 28%, about 29%, about 30%, about 31%, about 32%, about 33%, about 34%, about 35%, or about 36% ACE.

Also included within the formulations of type A is 8-15% thermoplastic resin. In preferred embodiments, the thermoplastic resin is polyvinyl chloride (PVC) resin. Other non-limiting examples of suitable thermoplastic resins include chlorinated polyvinyl chloride (CPVC) and acrylonitrile butadiene styrene (ABS) resins. When the thermoplastic resin is CPVC or ABS, it is possible that the thermoplastic resin included in the present formulations in an amount that is less than 8% or more than 15%. Otherwise, the formulations may include 9-14%, 9-13%, 10-12%, 11-12%, about 8%, about 9%, about 10%, about 11%, about 12%, about 13%, about 14%, or about 15% thermoplastic resin, such as PVC. It is typically the case that a solvent cement includes a resin that is chemically similar to the thermoplastic material of which the objects to be bonded are made. Accordingly, the present formulations are especially suitable for use in bonding PVC, ABS, or CPVC objects together.

The formulations of type A also include 0.5-5% silica ($SiO_2$). For example, the formulations may include 1-4%, 1.5-3.5%, 2-3%, about 0.5%, about 1%, about 1.5%, about 2%, about 2.5%, about 3%, about 3.5%, about 4%, about 4.5%, or about 5% silica.

The formulations of type A further include 0.01-0.4% of a solvent soluble acrylic copolymer associative thickener. Thickeners of the present variety are "associative" because they contain polar groups that associate with the polar aspects of the silica component, and non-polar groups that associate with the non-polar aspects of the resin component of the formulations. This dual association represents an unexpected effect of the thickeners, and results in the formation of a network that in turn thickens the formulation when each of the silica, resin, and thickener components are present.

In certain aspects, the acrylic copolymer can be formed from a) one or more ethylenically unsaturated monomers containing at least one carboxylic acid group, and b) a second ethylenically unsaturated monomeric component comprising a linear or branched alkyl ester of acrylic acid or (meth)acrylic acid.

Exemplary ethylenically unsaturated monomers containing at least one carboxylic acid group which are set forth under monomeric component a) include acrylic acid, (meth)acrylic acid, itaconic acid, fumaric acid, crotonic acid, aconitic acid, or maleic acid, salts thereof, and mixtures thereof. The amount of the at least one carboxylic acid group containing monomer may be from about 10 to about 80% by weight, about 20 to about 70% by weight, about 30 to about 70% by weight, about 35 to about 65% by weight, about 40 to about 60% by weight, or about 45 to about 55% by weight of the acrylic polymer.

The alkyl esters of acrylic acid or (meth)acrylic acid can include substituted or unsubstituted, and branched or linear alkyl esters of acrylic acid or (meth)acrylic acid. For example, an alkyl ester of acrylic acid or (meth)acrylic acid can include hydroxyalkyl esters. The alkyl ester may include a $C_1$-$C_{20}$ alkyl, a $C_1$-$C_{10}$, a $C_1$-$C_5$, or a $C_1$-$C_2$ alkyl group. Non-limiting examples of monomers comprising alkyl esters of acrylic acid or (meth)acrylic acid set forth under monomeric component b) include methyl (meth)acrylate or acrylate, ethyl (meth)acrylate or acrylate, n-propyl (meth)acrylate or acrylate, iso-propyl (meth)acrylate or acrylate, n-butyl (meth)acrylate or acrylate, isobutyl (meth)acrylate or acrylate, t-butyl (meth)acrylate or acrylate, n-amyl (meth)acrylate or acrylate, iso-amyl (meth)acrylate or acrylate, hydroxyethyl (meth)acrylate or acrylate, hydroxypropyl (meth)acrylate or acrylate, hydroxybutyl (meth)acrylate or acrylate, and mixtures thereof. The amount of the monomers comprising an alkyl ester of acrylic acid or (meth)acrylic acid can be about 10 to about 80% by weight, about 20 to about 70% by weight, about 30 to about 70% by weight, about 35 to about 65% by weight, about 40 to about 60% by weight, or about 45 to about 55% by weight of the acrylic polymer.

An exemplary solvent soluble acrylic copolymer associative thickener in accordance with the present disclosure is Solthix™ 250 (The Lubrizol Corporation, Wickliffe, Ohio).

The amount of solvent soluble acrylic copolymer associative thickener in the formulations of type A may be 0.01-0.4%. For example, the formulations may include 0.01-0.35%, 0.01-0.3%, 0.02-0.3%, 0.02-0.2%, 0.02-0.1%, 0.02-0.08%, 0.02-0.06%, 0.02-0.05%, 0.02-0.04%, 0.025-

0.035%, about 0.01%, about 0.015%, about 0.02%, about 0.025%, about 0.03%, about 0.035%, about 0.04%, about 0.045%, about 0.05%, about 0.06%, about 0.07%, about 0.08%, about 0.09%, about 0.1%, about 0.125%, about 0.15%, 0.175%, about 0.2%, 0.225%, about 0.25%, about, 0.275%, about 0.3%, about 0.325%, about 0.35%, about 0.375%, or about 0.4% of the solvent soluble acrylic copolymer associative thickener.

Certain embodiments of the solvent cement formulations of type A comprise 0-17% tetrahydrofuran, 23-47% cyclohexanone, 9-23% methyl ethyl ketone, 23-34% acetone, 10-13% polyvinyl chloride, 1-4% silica, and 0.02-0.4% of the solvent soluble acrylic copolymer associative thickener. In other embodiments, the formulations comprise 40-49% cyclohexanone, 7-21% methyl ethyl ketone, 21-36% acetone, 8-15% polyvinyl chloride, 0.5-5% silica, and 0.01-0.4% of the solvent soluble acrylic copolymer associative thickener, wherein the formulation does not include any tetrahydrofuran. Other embodiments of the formulations of type A include 11-19% tetrahydrofuran, 21-29% cyclohexanone, 11-20% methyl ethyl ketone, 26-34% acetone, 8-15% polyvinyl chloride, 0.5-5% silica, and 0.01-0.08% of the solvent soluble acrylic copolymer associative thickener. In some instances, the formulations comprise about 15% tetrahydrofuran, about 25% cyclohexanone, about 16% methyl ethyl ketone, about 30% acetone, about 11.5 to about 12% polyvinyl chloride, about 2 to about 2.5% silica, and about 0.03% of the solvent soluble acrylic copolymer associative thickener.

As used throughout the present disclosure, the "initial viscosity" of formulation represents its viscosity as measured using a Brookfield viscometer (Brookfield Engineering Laboratories, Inc., Middleboro, Mass.) substantially immediately following combination of the respective ingredients and cooling down the combination to about room temperature, for example, 72-74° F. The initial viscosity of the formulations of type A may be at least 1700 cP. In certain instances, the formulations have an initial viscosity of about 1700 cP to about 7000 cP. For example, the initial viscosity may be about 1700 cP, about 2000 cP, about 2300 cP, about 2500 cP, about 2700 cP, about 2800 cP, about 3000 cP, about 3300 cP, about 3500 cP, about 3700 cP, about 3900 cP, about 4000 cP, about 4200 cP, about 4300 cP, about 4400 cP, about 4500 cP, about 4600 cP, about 4800 cP, about 4900 cP, about 5000 cP, about 5100 cP, about 5200 cP, about 5300 cP, about 5400 cP, about 5500 cP, about 5600 cP, about 5700 cP, about 5800 cP, about 5900 cP, about 6000 cP, about 6100 cP, about 6200 cP, about 6300 cP, about 6400 cP, about 6500 cP, about 6600 cP, about 6700 cP, about 6800 cP, about 6900 cP, or about 7000 cP.

The solvent cement formulations of type A may have a lap shear strength of at least 280 psi after two hours curing time, at least 500 psi after 16 hours curing time, and at least 950 psi after 72 hours curing time. The lap shear strength of the formulations of type A therefore exceed the minimum standard described in ASTM D2564. The formulations may have a lap shear strength of about 280 to about 375 psi after two hours curing time. For example, the lap shear strength may be about 280, about 290, about 300, about 310, about 320, about 330, about 340 about 350, about 360, about 370, or about 375 psi after two hours curing time. After 16 hours curing time, the formulations may have a lap shear strength of about 500 to about 710 psi. For example, the lap shear strength of the formulations of type A after 16 hours curing time may be about 500, about 520, about 540, about 550, about 560, about 570, about 580, about 600, about 610, about 615, about 620, about 630, about 635, about 640, about 645, about 650, about 660, about 670, about 680, about 690, about 700, or about 710 psi. After 72 hours curing time, the formulations may have a lap shear strength of about 950 to about 1200 psi. For example, the lap shear strength of the formulations of type A after 72 hours curing time may be about 950, about 960, about 970, about 980, about 990, about 1000, about 1020, about 1050, about 1075, about 1100, about 1125, about 1150, about 1175, or about 1200 psi.

The instant formulations of type A may have a Zahn cup #5 viscosity of about 15 to about 60 seconds. For example, the formulations may have a Zahn cup #5 viscosity of 15 seconds, about 17 seconds, about 18 seconds, about 20 seconds, about 21 seconds, about 22 seconds, about 23 seconds, about 24 seconds, about 25 seconds, about 30 seconds, about 35 seconds, about 40 seconds, about 45 seconds, about 50 seconds, about 55 seconds, or about 60 seconds.

Also disclosed are solvent cement formulations comprising: 20-31% tetrahydrofuran; 21-29% cyclohexanone; 0-14% methyl ethyl ketone; 21-35% acetone; 10-17% thermoplastic resin; 1-4% silica; and, 0.01-0.05% of a solvent soluble acrylic copolymer associative thickener, wherein the percent value of all named components do not exceed 100. Such formulations may be referred to as "type B", in order to distinguish them from other solvent cements disclosed herein.

The type B formulations are ideal for heavy-duty uses in the context of joining piping elements, in accordance with the requirements of ASTM D2564. For example, as described more fully infra, the type B formulations meet or exceed the minimum viscosity and lap shear strength requirements for heavy-bodied solvent cements under ASTM D2564.

The present formulations of type B include 20-31% tetrahydrofuran (THF). In some embodiments, the formulations may contain 20-29%, 22-29%, 23-28%, 24-27%, 25-27%, about 21%, about 22%, about 23%, about 24%, about 25%, about 26%, about 27%, about 28%, about 29%, about 30%, or about 31% THF.

The present formulations of type B also include 21-29% cyclohexanone (CYH). For example, the formulations may include 22-29%, 23-28%, 23-27%, 24-26%, about 21%, about 22%, about 23%, about 24%, about 25%, about 26%, about 27%, about 28%, or about 29% CYH.

The formulations of type B further contain 0-14% methyl ethyl ketone (MEK). For example, the formulations may include 0-12%, 0-10%, 0-9%, 2-10%, 4-10%, 6-10%, 6-9%, 7-8%, 0%, about 0.5%, about 1%, about 2%, about 3%, about 4%, about 5%, about 6%, about 7%, about 8%, about 9%, about 10%, about 11%, about 12%, about 13%, or about 14% MEK.

The formulations of type B also include 21-35% acetone (ACE). For example, the formulations may include 22-35%, 23-33%, 23-31%, 24-31%, 25-31%, about 21%, about 22%, about 23%, about 24%, about 25%, about 26%, about 27%, about 28%, about 29%, about 30%, about 31%, about 32%, about 33%, about 34%, or about 35% ACE.

Also included within the formulations of type B is 10-17% thermoplastic resin. In preferred embodiments, the thermoplastic resin is polyvinyl chloride (PVC) resin. Other nonlimiting examples of suitable thermoplastic resins include chlorinated polyvinyl chloride (CPVC) and acrylonitrile butadiene styrene (ABS) resins. When the thermoplastic resin is CPVC or ABS, it is possible that the thermoplastic resin included in the present formulations in an amount that is less than 8% or more than 15%. Otherwise, the formulations may include 10-16%, 11-15%, 12-14%, about 10%, about 11%, about 12%, about 13%, about 14%, about 15%, about 16%, or about 17% thermoplastic resin such as PVC. It is typically the case that a solvent cement includes a resin that is chemically similar to the thermoplastic material of which the objects to be bonded are made. Accordingly, the present formulations are especially suitable for use in bonding PVC, CPVC, and ABS objects together.

The formulations of type B also include 1-4% silica ($SiO_2$). For example, the formulations may include 1.5-4%, 1.5-3.5%, 2-3%, about 1%, about 1.5%, about 2%, about 2.5%, about 3%, about 3.5%, about 3.5%, or about 4% silica.

The formulations of type B further include 0.01-0.05% of a solvent soluble acrylic copolymer associative thickener. The preceding disclosure relating to the characteristics and various embodiments of such thickeners in connection with the formulations of type A applies in its entirety to the thickeners for use in the present formulations of type B.

The amount of solvent soluble acrylic copolymer associative thickener in the formulations of type B may be 0.01-0.05%. For example, the formulations may include 0.01-0.045%, 0.01-0.04%, 0.01-0.035%, 0.02-0.0325%, 0.02-0.03%, about 0.01%, about 0.015%, about 0.02%, about 0.025%, about 0.03%, about 0.035%, about 0.04%, about 0.045%, or about 0.05% of the solvent soluble acrylic copolymer associative thickener.

Certain embodiments of the solvent cement formulations of type B comprise 23-31% tetrahydrofuran; 21-29% cyclohexanone; 0-5% methyl ethyl ketone; 27-35% acetone; 11-17% polyvinyl chloride; 1-4% silica; and, 0.01-0.05% of the solvent soluble acrylic copolymer associative thickener. In other embodiments, the formulations comprise 25-29% tetrahydrofuran; 23-27% cyclohexanone; 0-2% methyl ethyl ketone; 29-34% acetone; 12-16% polyvinyl chloride; 2-3% silica; and, 0.02-0.04% of the solvent soluble acrylic copolymer associative thickener. Other embodiments of the formulations of type B include about 27% tetrahydrofuran; about 25% cyclohexanone; about 31.5% acetone; about 14% polyvinyl chloride; about 2.5% silica; and, about 0.03% of the solvent soluble acrylic copolymer associative thickener, the formulations containing no methyl ethyl ketone.

The initial viscosity of the formulations of type B may be at least 2200 cP, which exceeds the minimum requirement for heavy-bodied formulations according to ASTM D2564. In certain instances, the formulations have an initial viscosity of about 2200 cP to about 7000 cP. For example, the initial viscosity may be about 2200 cP, about 2400 cP, about 2500 cP, about 2700 cP, about 2800 cP, about 3000 cP, about 3300 cP, about 3500 cP, about 3700 cP, about 3900 cP, about 4000 cP, about 4200 cP, about 4300 cP, about 4400 cP, about 4500 cP, about 4600 cP, about 4800 cP, about 4900 cP, about 5000 cP, about 5200 cP, about 5400 cP, about 5500 cP, about 5600 cP, about 5800 cP, about 6000 cP, about 6200 cP, about 6400 cP, about 6600 cP, about 6800 cP, or about 7000 cP.

The solvent cement formulations of type B may have a next day viscosity at 140° F. of at least 3000 cP. As used throughout the present disclosure, the "next day viscosity" of a solvent cement formulation refers to the viscosity of the formulation as measured using a Brookfield viscometer (Brookfield Engineering Laboratories, Inc., Middleboro, Mass.) when heated to about 140° F. about 24 hours following a) combination of the respective ingredients and b) cooling down the combination to about room temperature, for example, 72-74° F. In certain embodiments, the next day viscosity at 140° F. of the solvent cement formulations of type B may be about 3100-3900 cP, about 3100-3800 cP, about 3100 cP, about 3200 cP, about 3300 cP, about 3400 cP, about 3500 cP, about 3600 cP, about 3700 cP, about 3800 cP, or about 3900 cP.

The solvent cement formulations of type B may have a lap shear strength of at least 320 psi after two hours curing time, at least 600 psi after 16 hours curing time, and at least 1000 psi after 72 hours curing time. The lap shear strength of the formulations of type B therefore exceed the minimum standard described in ASTM D2564. The formulations may have a lap shear strength of about 320 to about 375 psi after two hours curing time. For example, the lap shear strength after two hours curing time may be about 320, about 330, about 340, about 350, about 360, about 370, or about 375 psi. The formulations may have a lap shear strength of about 600 to about 710 psi after 16 hours curing time. For example, the lap shear strength after 16 hours curing time may be about 600, about 610, about 620, about 630, about 640, about 650, about 660, about 670, about 680, about 690, about 700, or about 710 psi. The formulations of type B may have a lap shear strength after 72 hours curing time of about 900 to about 1100 psi. For example, the lap shear strength after 72 hours curing time may be about 900, about 910, about 920, about 930, about 940, about 950, about 960, about 970, about 980, about 990, about 1000, about 1010, about 1020, about 1030, about 1040, about 1050, about 1060, about 1070, about 1080, about 1090, or about 1100 psi.

The solvent cement formulations of type B may have a Zahn cup #5 viscosity of about 25 to about 35 seconds. For example, the Zahn cup #5 viscosity may be about 25, about 26, about 27, about 28, about 29, about 30, about 31, about 32, about 33, about 34, or about 35 seconds.

Other Ingredients

The inventive solvent cement formulations of type A and type B can include other components that confer desired properties.

For example, the inventive formulations can also contain up to 5% by weight of at least one solid particulate inorganic filler. More typically, they can contain about 0.1% or 0.75% by weight up to about 1.5%, 3%, or 4% by weight of the solid particulate inorganic filler. The particulate inorganic fillers are inert and are generally included in the solvent cements to improve working viscosity and structural strength, and to reduce production costs. The solid particulate inorganic fillers are preferably fine powders having an average particle size of less than about 50 microns and a density of less than about 4 g/mL. Examples include ground quartz, talc, magnesium silicate, calcium carbonate, clay, whiting, shell flour, wood flour, alumina, antimony trioxide, asbestos powder, barium sulfate, calcined clays, China clays, magnesium oxide, and mica powder.

Other optional components of the presently disclosed solvent cement formulations can include lubricants, stabilizers, plasticizers, colorants, pigments, thickeners (such as castor oil), thixotropic agents, polymeric rheology additives, or processing aids. Small amounts of pigments or colorants, such as titanium dioxide, carbon black, dyes, or other colorants may be added to the inventive formulations, for example, to serve as a guide for uniform mixing and to provide a method of distinguishing different adhesive compositions. Exemplary stabilizing agents for PVC, ABS, and CPVC formulations include alkyltin compounds, such as octyl tin maleate, methyltin, butyltin and octyltin; dialkyltin dicarboxylates; methyltin mercaptides and butyltin mercaptides; dialkyltin bis(alkylmercaptocarboxylate) including din-octyltin-S,S'-bis(isooctyl mercaptoacetate); and butylthiostannoic acid. Di-lower alkyl tin stabilizers such as $C_4$ to $C_8$ alkyltin mercaptides are typically preferred. The stabilizers, when present, may be included in amounts of from about 0.05 to 3% by weight. Triphenyl phosphite, BHT (butylated hydroxy toluene), complex calcium and zinc soaps of alkyl carboxylic acids and hydrotalcite can also be used.

Other ingredients that can be included in the inventive solvent cement formulations are polar organic compounds that are normally solid at room temperatures, but nonetheless act as liquid solvents when combined with one or more of the other liquid polar solvents that are present in the formulations. An exemplary polar organic compound is 1,2-butylene carbonate.

The present disclosure also provides methods for bonding a first plastic component to a second plastic component, the method comprising applying a solvent cement to a surface of the first plastic component, and, contacting the surface of the first plastic component to a surface of the second plastic component, the solvent cement being formed from the solvent cement formulation type A or the solvent cement formulation type B.

The first and second plastic components are preferably formed from the same material, such as PVC, CPVC, or ABS, and are preferably formed from the same material as the resin component in the solvent cement formulation Any objects that the user wishes to bond can function as the first and second plastic components. For example, the first component may be a piping component that includes a male end, and the second component may be a piping component that includes female end. However, the first and second components need not be piping components.

The step of applying the solvent cement to a surface of the first plastic component may be performed using any art-accepted process. For example, the solvent cement may be applied to the surface of the first plastic component by pouring, sprinkling, dabbing, brushing, spattering, or spraying the solvent cement onto the plastic component. The volume of solvent cement that is applied to the first plastic component should be sufficient to permit bonding between the first and second plastic components, and may readily be determined by those of ordinary skill in the art, depending on the nature of the first and second components, of the type of bond to be created, and the end use of the bonded components.

If desired, the present methods may also include applying the solvent cement to a surface of the second plastic component. Preferably, the surface of the second plastic component to which the solvent cement is applied represents at least a portion of the second plastic component that is contacted with a surface of the first plastic component, such as the surface of the first plastic component to which the solvent cement has also been applied.

The present disclosure further provides plastic articles comprising a first plastic component that is bonded to a second plastic component by a solvent cement formulation of type A or type B. The first plastic component may be bonded to the second plastic component using any of the methods disclosed above for bonding a first plastic component to a second plastic component.

The first and second plastic components are preferably formed from the same material, such as PVC, CPVC, or ABS, and are preferably formed from the same material as the resin component in the solvent cement formulation. Any objects that the user wishes to bond can function as the first and second plastic components. For example, the first component may be a piping component that includes a male end, and the second component may be a piping component that includes female end. When the first and second plastic components are each piping components, it can be said that the plastic article represents a section of piping.

However, the first and second components are not limited to piping components. Those of ordinary skill in the art can readily identify other articles that can be formed from first and second plastic articles, such as housings for electronics, toys, household items, apparel, fencing, flooring, gutters, siding, window frames, automotive components, medical device components, and other articles. In certain embodiments, the plastic article comprises additional plastic components in addition to the first and second components. In such instances, each of the components may be bonded to at least one of the other components by a solvent cement formulation according type A or type B.

EXAMPLES

The following examples are set forth so as to provide those of ordinary skill in the art with a complete disclosure and description of how the formulations, methods, and articles claimed herein may be developed and evaluated, and are intended to be purely exemplary of the invention and are not intended to limit the scope of what the inventors regard as their invention. Efforts have been made to ensure accuracy with respect to numbers (e.g., amounts), but some errors and deviations should be accounted for.

Example 1—Medium-Bodied Formulations

Solvent cement compositions were formed from the components listed in Table 1, below, in the specified amounts, which are expressed in terms of percentage by weight ("--" means zero percent).

TABLE 1

| | Sample | | | | | | | | | |
|---|---|---|---|---|---|---|---|---|---|---|
| | A1 | A2 | A3 | A4 | A5 | A6 | A7 | A8 | A9 | A10 |
| THF | — | — | — | — | 15.0 | 15.0 | — | — | — | 15.0 |
| CYH | 45.0 | 45.0 | 45.0 | 45.0 | 25.0 | 25.0 | 45.0 | 45.0 | 45.0 | 25.0 |
| MEK | 16.0 | 17.0 | 11.0 | 17.0 | 16.0 | 16.0 | 11.0 | 11.0 | 11.0 | 16.0 |
| ACE | 25.0 | 25.0 | 31.0 | 25.0 | 30.0 | 30.0 | 31.0 | 30.5 | 30.5 | 30.0 |
| PVC | 11.0 | 11.0 | 11.0 | 11.0 | 12.0 | 12.0 | 11.0 | 11.0 | 11.0 | 11.5 |
| Silica | 3.0 | 2.0 | 2.0 | 2.0 | 2.0 | 2.0 | 2.0 | 2.5 | 2.0 | 2.5 |
| Solthix ™ 250 | 0.03 | 0.03 | 0.20 | 0.30 | 0.03 | 0.03 | 0.03 | 0.03 | 0.03 | 0.03 |
| Total | 100 | 100 | 100 | 100 | 100 | 100 | 100 | 100 | 100 | 100 |

The formulations A1-A10 were assessed for one or more of initial viscosity, lap shear strength, Zahn cup #5 viscosity, VOC content, and density. Results are shown below in Table 2 (units of measurement as provided; "--" means not measured).

TABLE 2

| | | Sample | | | | | | | | |
|---|---|---|---|---|---|---|---|---|---|---|
| | A1 | A2 | A3 | A4 | A5 | A6 | A7 | A8 | A9 | A10 |
| Initial Viscosity (cP) | 6900 | 4800 | 900 | 2800 | 2800 | 3900 | 1750 | 4000 | 2800 | 2300 |
| Lap Shear Strength (psi) 2 hr | — | 284 | — | 310 | — | 364 | 311 | 315 | 318 | 377 |
| 16 hr | — | — | — | 554 | — | — | 645 | 500 | 611 | 710 |
| 72 hr | 1015 | 1110 | — | 1007 | — | 1199 | 1108 | 1046 | 997 | 1066 |
| Zahn Cup #5 Viscosity (sec) | — | — | — | 17 | — | 22 | 17 | — | 24 | — |
| VOC Content (g/L) | — | — | — | 367 | — | — | — | — | — | — |
| Density (lb/gal) | — | — | — | 7.675 | — | — | 7.694 | — | — | — |

All samples A1-A10 met or exceeded ASTM D2564 requirements for regular- and medium-bodied solvent cement formulations.

Example 2 Heavy-Bodied Formulations

Solvent cement compositions were formed from the components listed in Table 3, below, in the specified amounts, which are expressed in terms of percentage by weight ("--" means zero percent).

TABLE 3

| | Sample | | | |
|---|---|---|---|---|
| | B1 | B2 | B3 | B4 |
| THF | 25.0 | 25.0 | 27.0 | 25.0 |
| MEK | 8.5 | 8.5 | — | 9.5 |
| CYH | 25.0 | 25.0 | 25.0 | 25.0 |
| ACE | 25.0 | 25.0 | 31.5 | 25.0 |
| PVC | 14.0 | 14.0 | 14.0 | 13.0 |
| Silica | 2.5 | 2.5 | 2.5 | 2.5 |
| Solthix ™ 250 | 0.03 | 0.03 | 0.03 | 0.03 |
| Total | 100 | 100 | 100 | 100 |

The formulations B1-B4 were assessed for one or more of initial viscosity, next-day viscosity, lap shear strength, Zahn cup #5 viscosity, VOC content, and density. Results are shown below in Table 4 (units of measurement as provided; "--" means not measured).

TABLE 4

| | Sample | | | |
|---|---|---|---|---|
| | B1 | B2 | B3 | B4 |
| Initial Viscosity (cP) | 7000 | 3600 | 2700 | 2200 |
| 140° F. Next Day Viscosity (cP) | 3150 | 3600 | 3800 | 3700 |
| Lap Shear Strength (psi) 2 hr | 324 | 368 | 334 | — |
| 16 hr | 618 | 704 | 678 | — |
| 72 hr | 1026 | 1028 | 1036 | — |
| Zahn Cup #5 Viscosity (sec) | 29 | — | 31 | — |

TABLE 4-continued

| | Sample | | | |
|---|---|---|---|---|
| | B1 | B2 | B3 | B4 |
| VOC Content (g/L) room | — | — | 346.5879 | — |
| oven | — | — | 368.5213 | — |
| Density (lb/gal) | — | — | 7.788 | — |

All samples B1-B4 met or exceeded ASTM D2564 requirements for heavy-bodied solvent cement formulations.

Example 3—Additional Medium-Bodied Formulations

Solvent cement compositions were formed from the components listed in Table 5, below, in the specified amounts, which are expressed in terms of percentage by weight ("--" means zero percent).

TABLE 5

| | Sample | |
|---|---|---|
| | C1 | C2 |
| THF | — | — |
| MEK | 11.0 | 11.0 |
| CYH | 45.0 | 45.0 |
| ACE | 30.5 | 30.5 |
| PVC | 11.5 | 11.5 |
| Silica | 2.0 | 2.0 |
| Solthix ™ 250 | 0.04 | 0.06 |
| Total | 100 | 100 |

The formulations C1 and C2 were assessed for one or more of initial viscosity, lap shear strength, Zahn cup #5 viscosity, VOC content, and density. Results are shown below in Table 6 (units of measurement as provided; "--" means not measured).

TABLE 6

| Sample | | C1 | C2 |
|---|---|---|---|
| Initial Viscosity (cP) | | 5200 | 6500 |
| Lap Shear Strength (psi) | 2 hr | 347 | 370 |
| | 16 hr | 743 | 689 |
| | 72 hr | 1132 | 1160 |
| Zahn Cup #5 Viscosity (sec) | | 25 | 35 |
| VOC Content (g/L) | room | — | — |
| | oven | 341 | — |
| Density (lb/gal) | | 7.674 | 7.865 |

Both samples C1 and C2 met or exceeded ASTM D2564 requirements for regular- and medium-bodied solvent cement formulations.

What is claimed:

1. A solvent cement formulation comprising:
   0-19% tetrahydrofuran;
   21-49% cyclohexanone;
   7-21% methyl ethyl ketone;
   21-36% acetone;
   8-15% polyvinyl chloride;
   0.5-5% silica; and,
   0.01-0.4% of a solvent soluble acrylic copolymer associative thickener,
   wherein the percent value of all named components do not exceed 100.

2. The solvent cement formulation according to claim 1 comprising:
   0-17% tetrahydrofuran;
   23-47% cyclohexanone;
   9-23% methyl ethyl ketone
   23-34% acetone
   10-13% polyvinyl chloride
   1-4% silica; and,
   0.02-0.4% of said thickener.

3. The solvent cement formulation according to claim 1 comprising:
   40-49% cyclohexanone;
   7-21% methyl ethyl ketone;
   21-36% acetone;
   8-15% polyvinyl chloride;
   0.5-5% silica; and,
   0.01-0.4% of said thickener,
   wherein said formulation does not include any tetrahydrofuran.

4. The solvent cement formulation according to claim 1 comprising:
   11-19% tetrahydrofuran;
   21-29% cyclohexanone;
   11-20% methyl ethyl ketone;
   26-34% acetone;
   8-15% polyvinyl chloride;
   0.5-5% silica; and,
   0.01-0.08% of said thickener.

5. The solvent cement formulation according to claim 1 comprising:
   about 15% tetrahydrofuran;
   about 25% cyclohexanone;
   about 16% methyl ethyl ketone;
   about 30% acetone;
   about 11.5 to about 12% polyvinyl chloride;
   about 2 to about 2.5% silica; and,
   about 0.03% of said thickener.

6. The solvent cement formulation according to claim 1 having an initial viscosity of at least 1700 cP.

7. The solvent cement formulation according to claim 1 having an initial viscosity of about 1700 cP to about 7000 cP.

8. The solvent cement formulation according to claim 1 having a lap shear strength of at least 280 psi after two hours of curing time, at least 500 psi after 16 hours of curing time, and at least 950 psi after 72 hours of curing time.

9. A method for bonding a first plastic component to a second plastic component, the method comprising:
   applying a solvent cement to a surface of the first plastic component, and,
   contacting the surface of the first plastic component to a surface of the second plastic component,
   the solvent cement being formed from the solvent cement formulation according to claim 1.

10. A section of plastic piping comprising a first plastic component that is bonded to a second plastic component by a solvent cement formulation according to claim 1.

* * * * *